US008889301B2

(12) United States Patent
Balsara et al.

(10) Patent No.: US 8,889,301 B2
(45) Date of Patent: Nov. 18, 2014

(54) GEL POLYMER ELECTROLYTES FOR BATTERIES

(75) Inventors: Nitash Pervez Balsara, El Cerrito, CA (US); Hany Basam Eitouni, Berkeley, CA (US); Ilan Gur, San Francisco, CA (US); Mohit Singh, Berkeley, CA (US); William Hudson, Berkeley, CA (US)

(73) Assignee: Seeo, Inc., Hayward, CA (US)

( * ) Notice: Subject to any disclaimer, the term of this patent is extended or adjusted under 35 U.S.C. 154(b) by 386 days.

(21) Appl. No.: 12/812,214

(22) PCT Filed: Jan. 16, 2009

(86) PCT No.: PCT/US2009/031356
§ 371 (c)(1),
(2), (4) Date: Jul. 27, 2010

(87) PCT Pub. No.: WO2009/092058
PCT Pub. Date: Jul. 23, 2009

(65) Prior Publication Data
US 2011/0206994 A1   Aug. 25, 2011

Related U.S. Application Data

(60) Provisional application No. 61/021,613, filed on Jan. 16, 2008.

(51) Int. Cl.
*H01M 6/14* (2006.01)
*H01M 10/0565* (2010.01)
*H01M 10/0525* (2010.01)

(52) U.S. Cl.
CPC ...... *H01M 10/0565* (2013.01); *H01M 10/0525* (2013.01); *H01M 2300/0085* (2013.01)
USPC .......................................................... 429/300

(58) Field of Classification Search
USPC .......................................................... 429/309
See application file for complete search history.

(56) References Cited

U.S. PATENT DOCUMENTS

| 3,711,412 A | 1/1973 | Sawyer |
| 4,311,566 A | 1/1982 | McCann |

(Continued)

FOREIGN PATENT DOCUMENTS

| EP | 0 766 329 A1 | 4/1997 |
| EP | 1 215 244 A2 | 6/2002 |

(Continued)

OTHER PUBLICATIONS

Hanjun Zhang et al., Blends of POSS-PEO(n=4)8 and High Molecular Weight Poly(ethylene oxide) as Solid Polymer Electrolytes for Lithium Batteries, J. Phys. Chem. B 2007, vol. 111, Published on-line Mar. 2007, pp. 3583-3590.*

(Continued)

*Primary Examiner* — Patrick Ryan
*Assistant Examiner* — Lucas J O Donnell
(74) *Attorney, Agent, or Firm* — R'Sue Popowich Caron

(57) ABSTRACT

Nanostructured gel polymer electrolytes that have both high ionic conductivity and high mechanical strength are disclosed. The electrolytes have at least two domains—one domain contains an ionically-conductive gel polymer and the other domain contains a rigid polymer that provides structure for the electrolyte. The domains are formed by block copolymers. The first block provides a polymer matrix that may or may not be conductive on by itself, but that can soak up a liquid electrolyte, thereby making a gel. An exemplary nanostructured gel polymer electrolyte has an ionic conductivity of at least $1\times10^{-4}$ S cm$^{-1}$ at 25° C.

21 Claims, 12 Drawing Sheets

(56) References Cited

U.S. PATENT DOCUMENTS

| | | |
|---|---|---|
| 4,582,876 A | 4/1986 | Weemes |
| 5,041,346 A | 8/1991 | Giles |
| 5,523,180 A | 6/1996 | Armand |
| 5,639,574 A | 6/1997 | Hubbard |
| 5,658,685 A * | 8/1997 | Oliver .......................... 429/303 |
| 6,387,570 B1 * | 5/2002 | Nakamura et al. ............ 429/300 |
| 6,506,523 B1 | 1/2003 | Hatazawa |
| 6,835,495 B2 | 12/2004 | Michot |
| 7,315,106 B2 | 1/2008 | Asaka |
| 7,999,020 B2 * | 8/2011 | Frisbie et al. ................. 524/105 |
| 2002/0048706 A1 * | 4/2002 | Mayes et al. ............... 429/231.1 |
| 2003/0205268 A1 | 11/2003 | Nakamura |
| 2006/0289405 A1 | 12/2006 | Oberste-Berghaus |
| 2008/0191200 A1 * | 8/2008 | Frisbie et al. ................... 257/40 |
| 2009/0075176 A1 | 3/2009 | Singh |

FOREIGN PATENT DOCUMENTS

| | | |
|---|---|---|
| JP | 7 109321 A | 4/1995 |
| WO | 2007142731 A2 | 12/2007 |
| WO | WO 2007142731 A2 * | 12/2007 |

OTHER PUBLICATIONS

Ignác Capek, Nature and properties of ionomer assemblies. II, Advances in Colloid and Interface Science, vol. 118, Issues 1-3, 30 Dec. 2005, pp. 73-112, ISSN 0001-8686.*

Jannasch, Loyens, "Characteristics of gel electrolytes formed by self-aggregating comb-shaped polyethers with end-functionalised side chains," Solid State Ionics 166 (2004) 417.

Jannasch, "Physically crosslinked gel electrolytes based on a self-assembling ABA triblock copolymer," Polymer 43 (2002) 6449.

Masuda et al: "Fabrication of all solid-state lithium polymer secondary batteries using PEG-borate/aluminate ester as plasticizer for polymer electrolyte", Solid State Ionics, North Holland Pub. Company. Amsterdam; NL, NL, vol. 178, No. 13-14, May 31, 2007, pp. 981-986, XP022112530, ISSN: 0167-2738, 001: 10.1016/J.SSI.2007.04.009.

A Elicegui A et al: "A study of plasticization effects in poly(vinylchloride)", Polymer, Elsevier Science Publishers B.V, GB, vol. 38, No. 7, Jan. 1, 1997, pp. 1647-1657, XP004055186, ISSN: 0032-3861, 001:10.1016/S0032-3861(96)00671-4.

* cited by examiner

GEL POLYMER ELECTROLYTES FOR BATTERIES

CROSS-REFERENCE TO RELATED APPLICATIONS

This application claims priority to U.S. Provisional Patent Application No. 61/021,613, filed Jan. 16, 2008, and to International Patent Application Number. PCT/US2009/031356, filed Jan. 16, 2009, both of which is incorporated by reference herein.

STATEMENT OF GOVERNMENT SUPPORT

The invention described and claimed herein was made in part utilizing funds supplied by the U.S. Department of Energy under Contract No. DE-AC02-05CH11231. The Government has certain rights in this invention.

BACKGROUND OF THE INVENTION

Field of the Invention

This invention relates generally to electrolyte materials, and, more specifically, to gel polymer electrolytes that have both high conductivity and high mechanical strength and are easily and affordably processed.

The demand for rechargeable batteries has grown by leaps and bounds as the global demand for technological products such as cellular phones, laptop computers and other consumer electronic products has escalated. In addition, interest in rechargeable batteries has been fueled by current efforts to develop green technologies such as electrical-grid load leveling devices and electrically-powered vehicles, which are creating an immense potential market for rechargeable batteries with high energy densities.

Li-ion batteries represent one of the most popular types of rechargeable batteries for portable electronics. Li-ion batteries offer high energy and power densities, slow loss of charge when not in use, and they do not suffer from memory effects. Because their many benefits, including their high energy density, Li-ion batteries have also been used increasingly in defense, aerospace, back-up storage, and transportation applications.

The electrolyte is an important part of a Li-ion rechargeable battery. During discharging, the electrolyte is a medium for ion flow between the electrodes, as a negative electrode material is oxidized, producing electrons, and a positive electrode material is reduced, consuming electrons. The electrons flow as current through an external circuit. Traditional Li-ion rechargeable batteries have used non-polymer liquid electrolytes. Exemplary liquid electrolytes in Li-ion batteries are composed of lithium-salts such as $LiPF_6$, $LiBF_4$, or $LiClO_4$ in organic solvents such as alkyl carbonates.

While non-polymer liquid electrolytes dominate current Li-based technologies, polymer electrolytes may constitute the next wave of advances for Li-based batteries. The gel polymer electrolyte rechargeable battery is especially attractive for Li-ion battery technology because, among other benefits, polymer electrolytes may have high thermal stability, low rates of self-discharge, stable operation over a wide range of environmental conditions, enhanced safety, flexibility in battery configuration, minimal environmental impacts, and low materials and processing costs. Gel polymer electrolytes have been of exceptional interest partly due to their amenability to novel form factors and packaging methods as seen in the thin, vacuum-sealed pouch cell designs of recent batteries for portable electronics.

Cross-linking or thermosetting of the polymer matrix has been used to achieve the mechanical robustness needed for commercial application of gel electrolytes. However, after cross-linking, the electrolyte no longer flows and is insoluble, thereby severely limiting subsequent processability as well as integration of the electrolyte with other battery components and packaging. In addition, optimization of cross-linking is very costly. Volume changes that result from cross-linking present difficulties in controlled processing and manufacturing of conventional gel electrolytes, and cross-linking tends to reduce ionic conductivity. In addition, cross-linked materials are generally non-recyclable.

Prototypical gel polymer electrolytes have been based on materials such as poly(ethylene oxide) (PEO), poly(acrylonitrile) (PAN), poly(methyl methacrylate) (PMMA) and poly (vinylidene fluoride) (PVdF). However, without cross-linking, electrolytes based on these materials suffer from very poor mechanical properties, especially when swollen with enough liquid electrolyte to achieve adequate conductivity for use in an electrochemical cell. Polymer electrolytes may enable the use of lithium metal anodes, which offer higher energy densities than do traditional lithium ion anodes, but fluorinated polymers are not chemically stable when used with lithium metal due to an interfacial reaction between lithium and fluorine that results in the formation of LiF, an undesirable outcome. LiF increases cell impedance, and the lithium that is used to form the LiF can no longer participate in the charging and discharging of the cell. Consequently, PVdF-based electrolytes are unsuitable for batteries with lithium metal anodes. In addition, vaporization of solvents, especially at high temperatures, leads to degradation in performance of these systems over time and the need for hermetic packaging.

There is still a strong need for non-crosslinked polymer electrolyte materials that have high ionic conductivity coupled with high mechanical strength, low reactivity with lithium, and reduced volatility and vaporization of solvents.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The preferred embodiments are illustrated in the context of electrolyte materials for electrochemical cells. The skilled artisan will readily appreciate, however, that the materials and methods disclosed herein will have application in a number of other contexts where high ionic conductivity is desirable, particularly where mechanical strength is important.

These and other objects and advantages of the present invention will become more fully apparent from the following description taken in conjunction with the accompanying drawings.

In one embodiment of the invention, a nanostructured polymer electrolyte material is a block copolymer that has both gelled regions for ion flow and rigid regions that give the overall electrolyte good mechanical strength. The gelled regions are formed by providing a block polymer matrix that may or may not be ionically conductive itself before a liquid electrolyte is added to it. The rigid regions are formed by phase-separated domains of a hard polymer block. The liquid electrolyte contains both solvent(s) and salt(s), providing ionic conductivity and electronic insulation.

In one embodiment of the invention, the nanostructured gel polymer electrolyte material can be used to improve performance of Li-based batteries by increasing energy density, improving thermal and environmental stability, reducing self-discharge rates, enhancing safety, reducing manufacturing costs, and enabling novel form factors. In an exemplary embodiment, a nanostructured gel polymer electrolyte material contains no fluorinated molecules and has an ionic conductivity of at least $1 \times 10^{-4}$ Scm$^{-1}$ at 25° C. In another exemplary embodiment, a nanostructured gel polymer electrolyte material is non-crosslinked, contains no fluorinated molecules and has an ionic conductivity of at least $1 \times 10^{-4}$ Scm$^{-1}$ at 25° C.

In one embodiment of the invention, a nanostructured gel polymer electrolyte is used in an electrochemical cell in a separator region between a positive electrode and a negative electrode. In an exemplary embodiment, the negative electrode is lithium metal or some alloy thereof which is highly reactive with fluorinated species. The nanostructured gel polymer electrolyte contains a liquid electrolyte [solvent(s) and salt(s)] that promotes conduction of ions through the nanostructured gel polymer electrolyte separator.

Figure 1A:
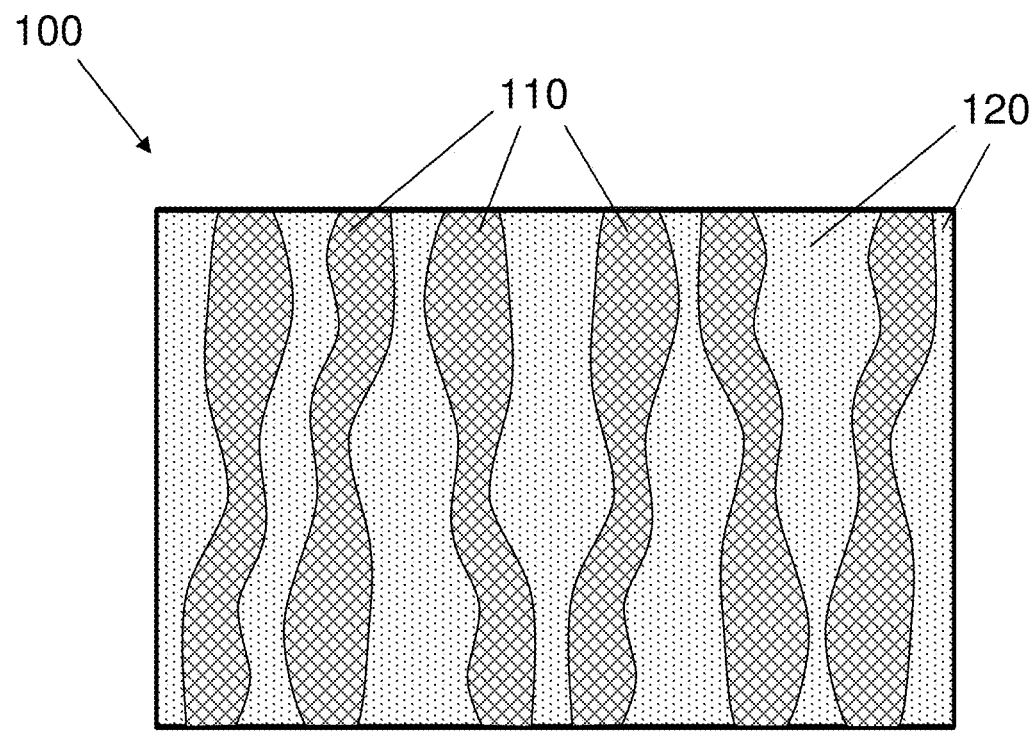
FIGS. 1A and 1B are simplified illustrations of an electrolyte material with a network of ionically conductive pathways within a structural network.

FIG. 1A is a schematic illustration of a two-phase nanostructured material 100. The material 100 has several regions that contain conductive phase 110 and several regions that contain a structural phase 120. The conductive phase 110 contains a polymer that provides a matrix into which an ionically-conductive liquid electrolyte can be absorbed. The conductive phase 110 may or may not be ionically conductive by itself before the liquid electrolyte is introduced. The structural phase 120 is interspersed with the conductive phase 110.

Figure 1B:
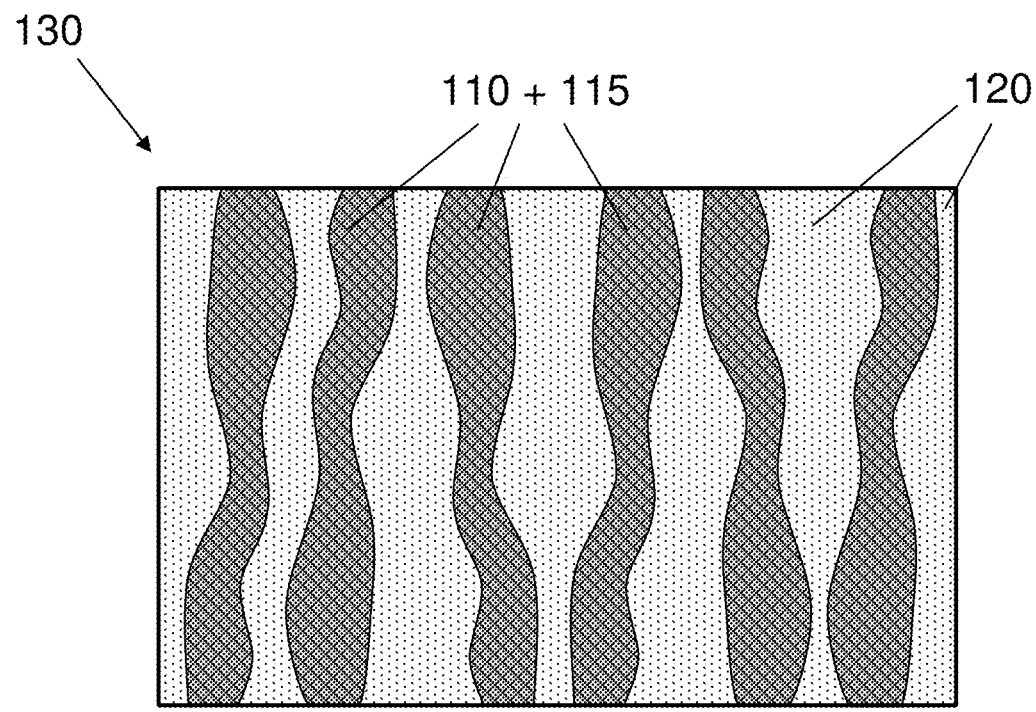

In FIG. 1B an electrolyte material 130 has been formed by adding a liquid electrolyte 115 (shown as grey coloring) to the conductive phase 110 to achieve a higher ionic conductivity that was possible for the structure in FIG. 1A. The structural phase 120 is essentially unaffected by the addition of the liquid electrolyte 115. The structure shown in FIG. 1B is not intended to convey any particular meaning other than to indicate that the electrolyte 130 has a two-phase structure. Although the morphology in FIG. 1B is approximately lamellar, other morphologies as are known for two-domain nanostructures are possible.

Figure 2A:
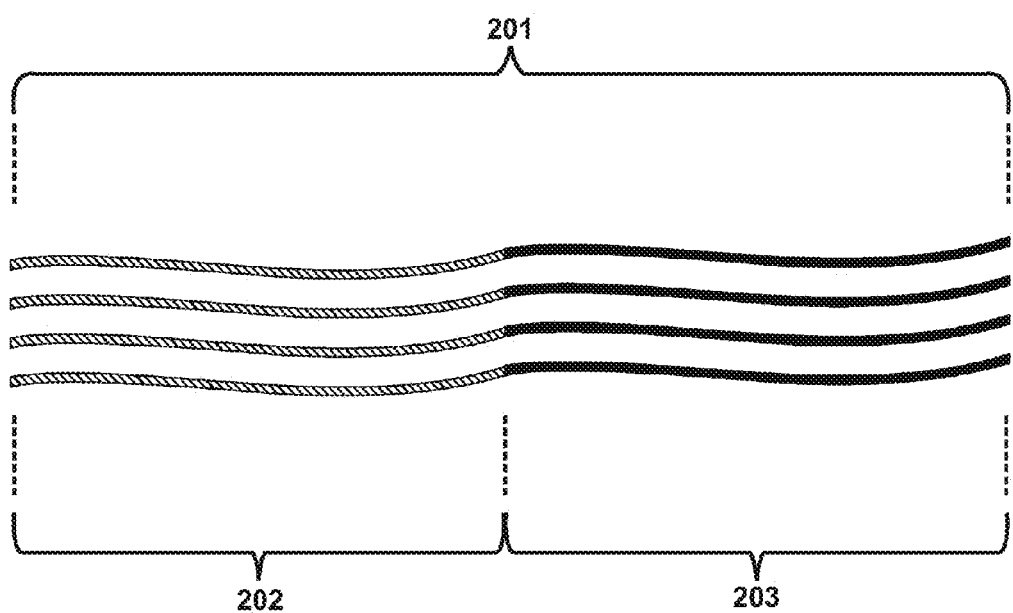
FIG. 2A is a schematic illustration of a plurality of linear polymer diblocks that make up a two-phase nanostructured gel polymer electrolyte.

FIG. 2A is a schematic illustration of a plurality 201 of linear polymer diblocks that make up a two-phase nanostructured gel polymer electrolyte, according to an embodiment of the invention. Each linear polymer diblock is made by self-assembly of a first polymer block 202 and a second polymer block 203, which are different from each other. The polymer blocks 202 are covalently bonded to the polymer blocks 203 at one end. The polymer blocks 202 are made of a polymer that provides a matrix into which a liquid electrolyte can be absorbed. The polymer in polymer blocks 202 may or may not be ionically conductive itself before the liquid electrolyte is added. The polymer blocks 203 are made of a polymer that has high mechanical strength. It is especially useful if polymer blocks 203 are made of a polymer that, in its homopolymer state, swells less than 5% in the presence of the liquid electrolyte that is added to the conductive blocks 202.

Figure 2B:
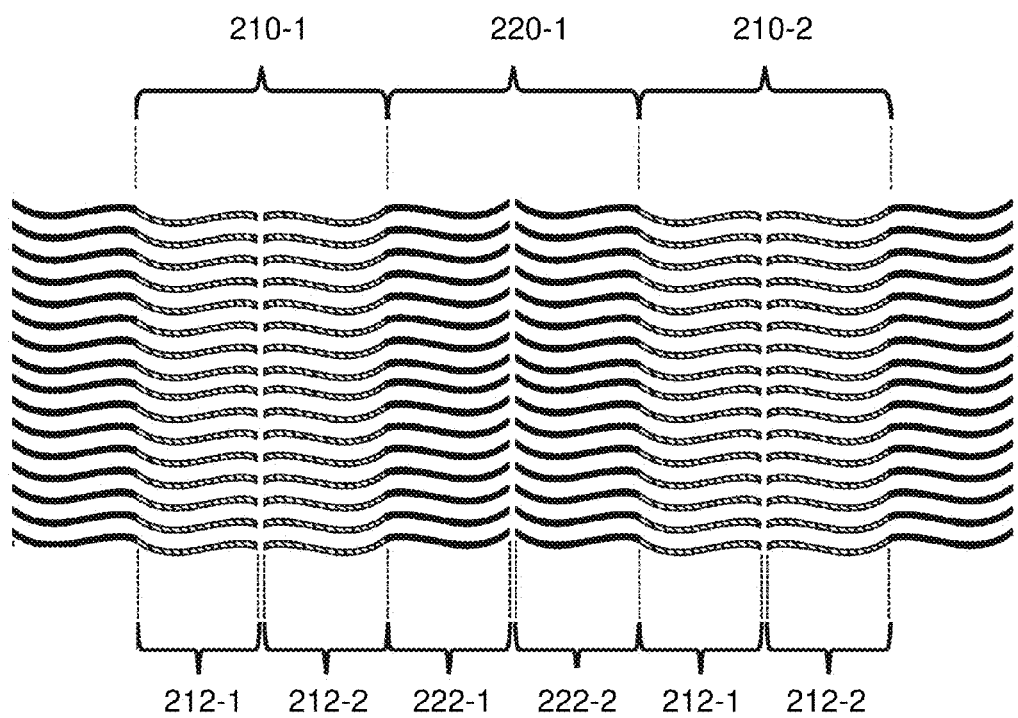
FIG. 2B is a schematic illustration of a portion of two-phase nanostructured gel diblock polymer electrolyte with alternating regions of a first domain and a second domain.

FIG. 2B is a schematic illustration of a portion of two-phase nanostructured gel polymer electrolyte with alternating regions of a first domain 210-$x$ and a second domain 220-$x$, according to an embodiment of the invention. The first domain 210-1 (and 210-2) contains polymer blocks 212-1, 212-2 of a first phase. Within any first domain 210-$x$, the polymer blocks 212-1 212-2 are not covalently bonded to one another, but can slide relative to each other in the region where their ends meet. The second domain 220-1 contains polymer blocks 222-1, 222-2 of a second phase. Within any second domain 220-$x$, the polymer blocks 222-1 222-2 are not covalently bonded to one another, but can slide relative to each other in the region where their ends meet. The first domain 210-1 is adjacent one side of the second domain 220-1. The first domain 210-2 is adjacent the other side of the second domain 220-1. There is another second domain (only a part of which is shown) adjacent the first domain 210-1. There is yet another second domain (only a part of which is shown) adjacent the first domain 210-2. The two phase structure continues with alternating first domains 210-$x$ and second domains 220-$x$.

In one arrangement, the first domain 210-$x$ is a conductive domain; polymer blocks 212-$x$ contain a polymer that is ionically conductive by itself and/or that provides a matrix into which an ionically-conductive liquid electrolyte can be absorbed. The second domain 220-$x$ is a structural domain; polymer blocks 222-$x$ contain a polymer that has high mechanical strength. In another arrangement, the first domain 210-$x$ is a structural domain; polymer blocks 212-$x$ contain a polymer that has high mechanical strength. The second domain 220-$x$ is a conductive domain; polymer blocks 222-$x$ contain a polymer that is ionically conductive by itself and/or that provides a matrix into which an ionically-conductive liquid electrolyte can be absorbed.

Diblocks can arrange themselves into a variety of morphologies, as is well known in the art. In the embodiments of the invention, as disclosed herein, the diblocks may arrange themselves into any geometrically possible morphology without limitation. Examples of possible morphologies include, but are not limited to lamellar, branched, cylindrical, and gyroid.

Figure 3:
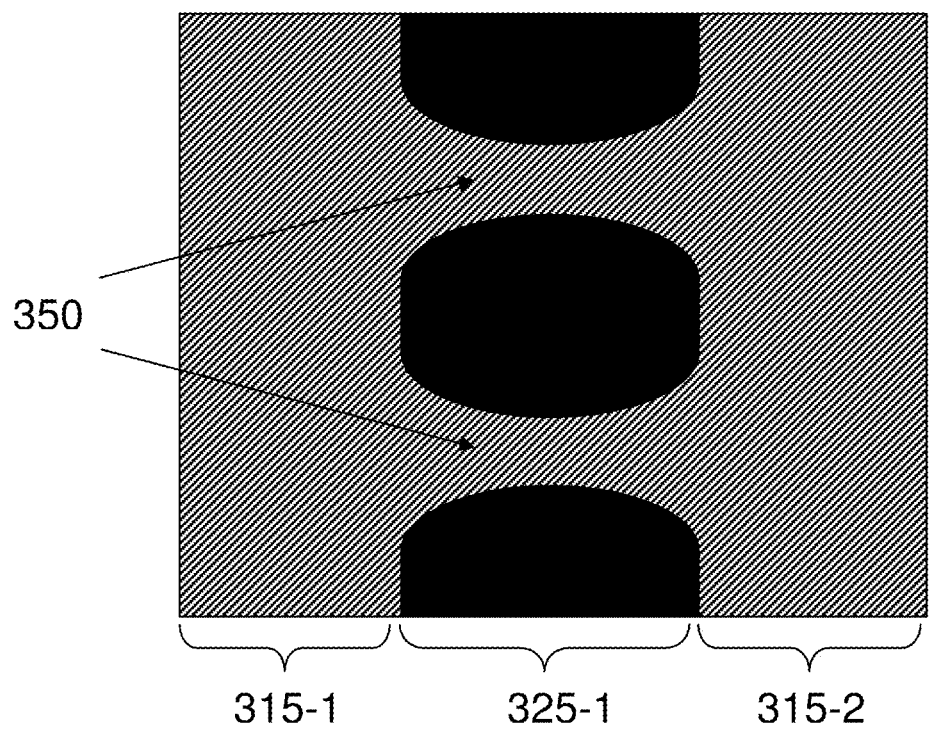
FIG. 3 is a schematic illustration of a portion of a two-domain perforated lamellar morphology, according to an embodiment of the invention.

FIG. 3 is a schematic illustration of a portion a of two-domain perforated lamellar morphology, according to an embodiment of the invention. The perforated lamellar structure has alternating layers of a first domain 315-x and a second domain 325-x. There are extensions 350 of the first domains 315-1, 315-2 into the second domain 325-1. The first domains 315-x extend into perforations in the second domains 325-x when the volume fraction of first domain phase 315-x is larger than the volume fraction of the second domain phase 325-x.

In one arrangement, the first domains 315-x contain a conductive phase and the second domains 325-x contain a structural phase. Such an arrangement can result in a nanostructured gel polymer electrolyte with higher conductivity than for morphologies with no perforations/extensions. In another arrangement, the first domains 315-x contain a structural phase and the second domains 325-x contain a conductive phase. Such an arrangement can result in a nanostructured gel polymer electrolyte with greater mechanical strength than for morphologies with no perforations/extensions.

Figure 4:
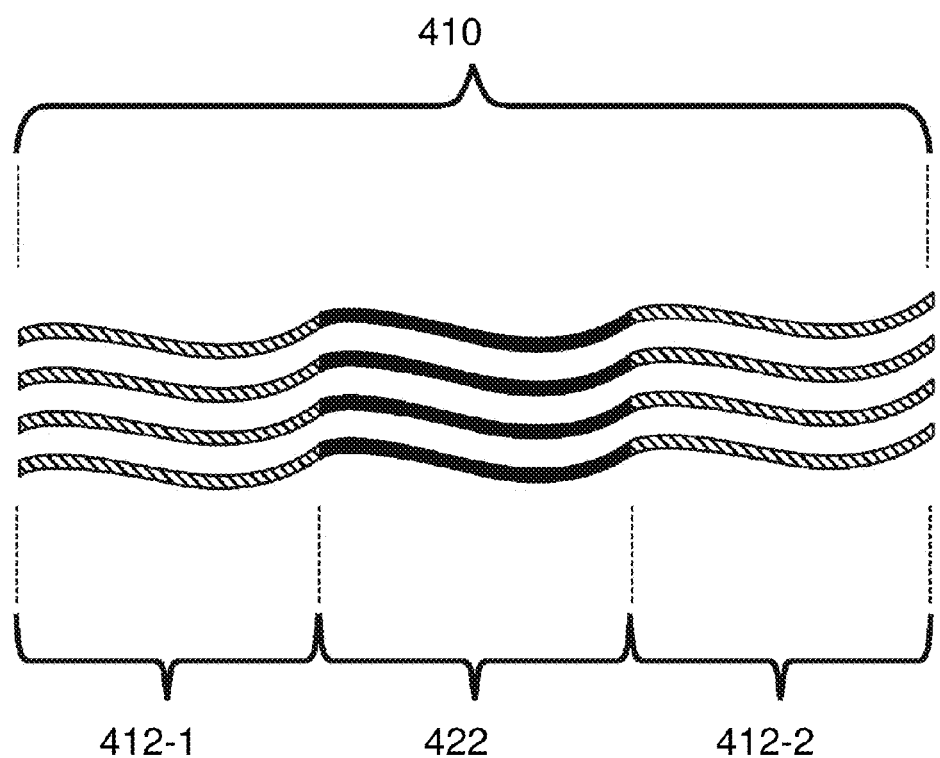
FIG. 4 is a schematic illustration of a plurality of linear polymer triblocks made of two types of polymer blocks arranged in an A-B-A configuration.

FIG. 4 is a schematic illustration of a plurality 410 of linear polymer triblocks made by self-assembly of two types of polymer blocks arranged in an A-B-A configuration. Each triblock has a first polymer block 412-1 of a first type, a polymer block 422 of a second type, and a second polymer block 421-2 of the first type. The polymer block 412-1 is covalently bonded to the polymer block 422. The polymer block 412-2 is also covalently bonded to the polymer block 422. In one arrangement, the polymer blocks 412-1, 412-2 of the first type contain a polymer that is ionically conductive by itself and/or that provides a matrix into which an ionically-conductive liquid electrolyte can be absorbed, and the polymer block 422 of the second type contains a polymer that has high mechanical strength. In another arrangement, the polymer block 412-1, 412-2 of the first type contains a polymer that has high mechanical strength, and the polymer block 422 of the second type contains a polymer that is ionically conductive by itself and/or that provides a matrix into which an ionically-conductive liquid electrolyte can be absorbed.

Figure 5:
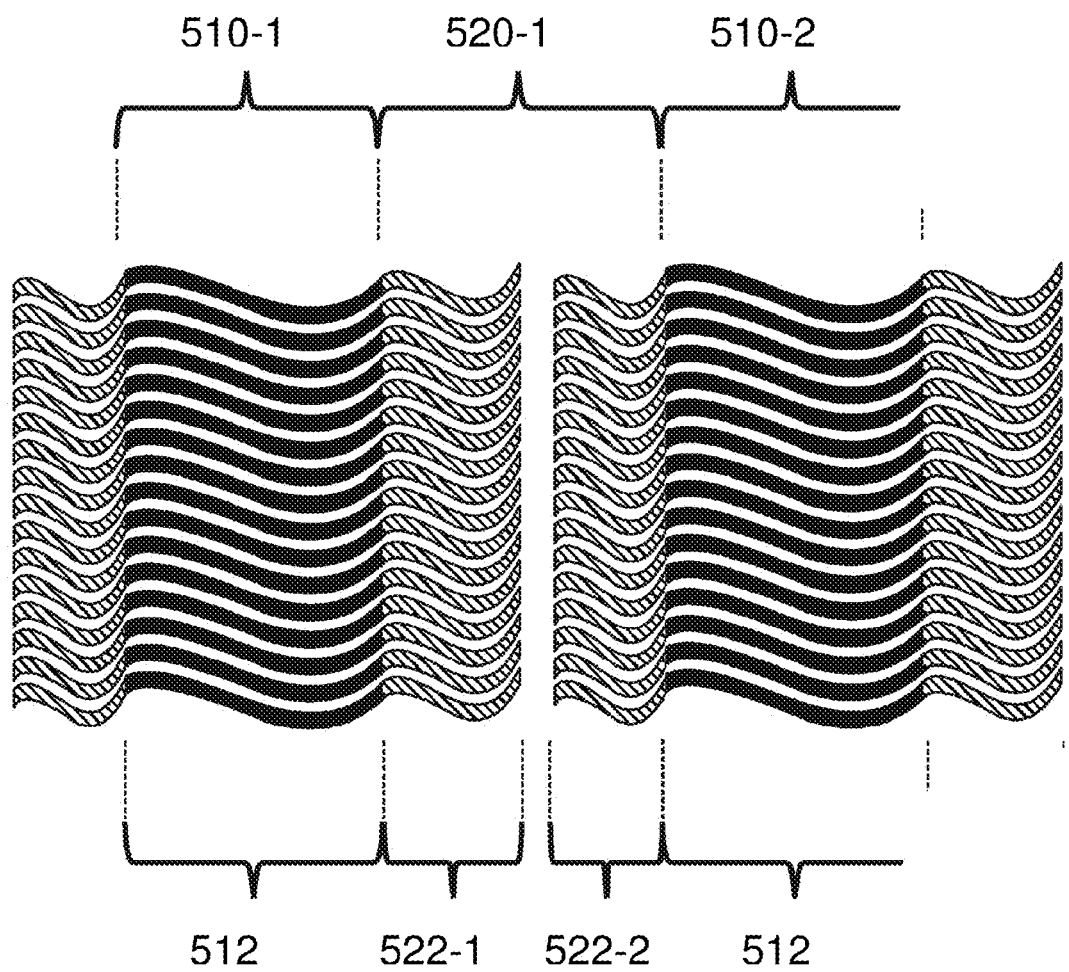
FIG. 5 is a schematic illustration of a portion of two-phase nanostructured gel triblock polymer electrolyte with alternating regions of a first domain and a second domain.

FIG. 5 is a schematic illustration of a portion of a two-phase nanostructured gel polymer electrolyte with alternating regions of a first domain 510-x and a second domain 520-x, according to an embodiment of the invention. The two-phase structure is made up from a plurality of triblock copolymers, such as those shown in FIG. 4. The first domains 510-1, 510-2 contain polymer blocks 512 of a first phase. The second domain 520-1 contains polymer blocks 522-1, 522-2 of a second phase. Within any second domain 520-x, the polymer blocks 522-1 522-2 are not covalently bonded to one another, but can slide relative to each other in the region where their ends meet. The first domain 510-1 is adjacent one side of the second domain 520-1. The first domain 510-2 is adjacent the other side of the second domain 520-1. There are other second domains (only parts of which are shown) adjacent the first domains 510-1, 510-2. The two phase structure continues with alternating regions of the first domains 510-x and the second domains 520-x.

In one arrangement, the first domains 510-x are conductive domains; the polymer blocks 512 contain a polymer that is ionically conductive by itself and/or that provides a matrix into which an ionically-conductive liquid electrolyte can be absorbed. The second domains 520-x are structural domains; the polymer blocks 522-x contain a polymer that has high mechanical strength. In another arrangement, the first domains 510-x are structural domains; the polymer blocks 512 contain a polymer that that has high mechanical strength. The second domains 520-x are conductive domains; the polymer blocks 522-x contain a polymer is ionically conductive by itself and/or that provides a matrix into which an ionically-conductive liquid electrolyte can be absorbed. A two-phase nanostructured gel polymer electrolyte made from triblock copolymers may be easier to handle during processing than one made from diblock copolymers. In diblock structures each block copolymer chain is part of two domains. In triblock structures, each block copolymer chain is part of three domains. The number of possible physical entanglements per chain increases with the number of domains of which the chain is a part. The toughness of the overall structure increases with the number of physical entanglements. Increases toughness can be very important in making the block copolymer material easy to process.

Figure 6:
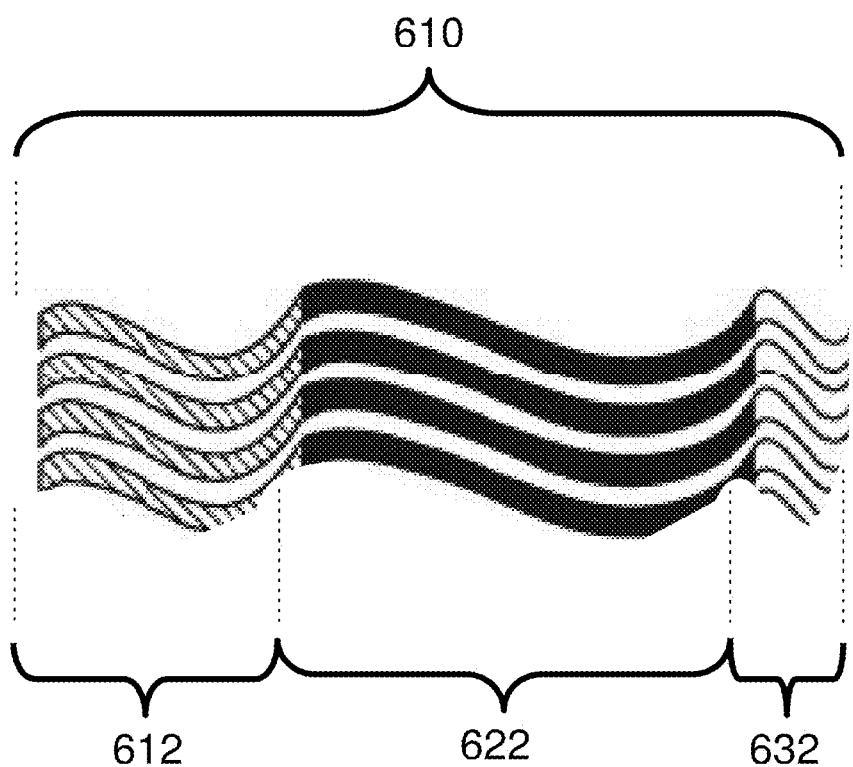
FIG. 6 is a schematic illustration of a plurality of linear polymer triblocks made of three types of polymer blocks arranged in an A-B-C configuration.

FIG. 6 is a schematic illustration of a plurality 610 of linear polymer triblocks made by self-assembly of three types of polymer blocks arranged in an A-B-C configuration. Each triblock has a polymer block 612 of a first type, a polymer block 622 of a second type, and a polymer block 632 of a third type. The polymer block 612 is covalently bonded to the polymer block 622. The polymer block 632 is also covalently bonded to the polymer block 622. In one arrangement, the polymer block 612 of the first type contains a polymer that is ionically conductive by itself and/or that provides a matrix into which an ionically-conductive liquid electrolyte can be absorbed. The polymer block 622 of the second type contains a polymer that has high mechanical strength. The polymer block 632 of the third type contains a polymer that enhances or adds a desirable property to an electrolyte made from the plurality 610 of the linear polymer triblocks. In other arrangements, the roles of the polymer blocks 612, 622, 632 can be changed as long as one of the blocks is ionically conductive, one of the blocks has high mechanical strength, and one of the blocks enhances or adds a desirable property to an electrolyte made from the plurality 610 of the linear polymer triblocks.

Figure 7:
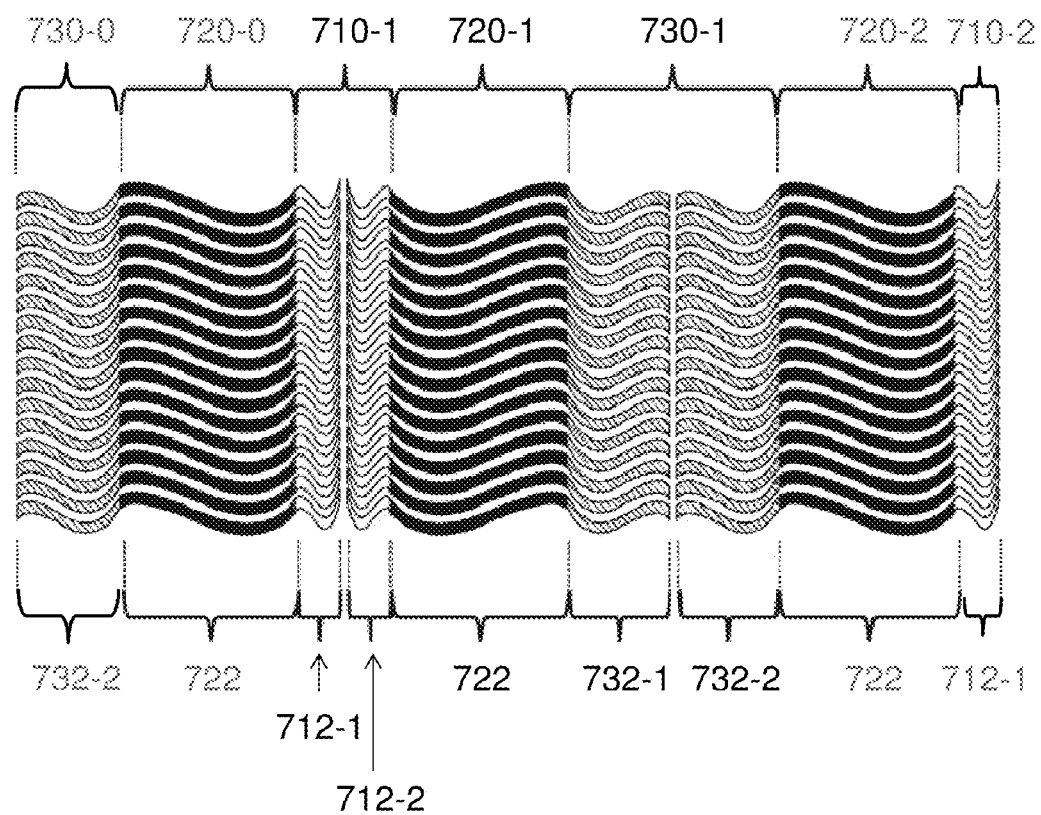
FIG. 7 is a schematic illustration of a portion of a three-phase nanostructured gel triblock polymer electrolyte with alternating regions of a first domain, a second domain, and a third domain.

FIG. 7 is a schematic illustration of a portion of a three-phase nanostructured gel polymer electrolyte with alternating regions of a first domain 710-x, a second domain 720-x, and a third domain 730-x, according to an embodiment of the invention. The three-phase structure is made from a plurality of A-B-C triblock copolymers, such as those shown in FIG. 6. The triblock copolymers are arranged end to end in an (A-B-C)(C-B-A)(A-B-C) arrangement. A first domain 710-1 contains polymer blocks 712-1, 712-2 of a first phase. Within any first domain 710-x, the polymer blocks 712-1 712-2 are not covalently bonded to one another, but can slide relative to each other in the region where their ends meet. A second domain 720-1 contains polymer blocks 722 of a second phase. The first domain 710-1 is adjacent one side of the second domain 720-1. A third domain 730-1 that contains polymer blocks 732-1, 732-2 of a third phase is adjacent the other side of the second domain 720-1. Within any third domain 730-x, the polymer blocks 732-1 732-2 are not covalently bonded to one another, but can slide relative to each other in the region where their ends meet. There are additional first domains 710-x, second domains 720-x, and third domains 730-x (some of which are shown) that continue the alternating pattern shown in FIG. 7 to form the overall three-phase nanostructured gel polymer electrolyte.

In one embodiment of the invention, the first domains 710-x are conductive domains; the polymer blocks 712-x contain a polymer that is ionically conductive by itself and/or that provides a matrix into which an ionically-conductive liquid electrolyte can be absorbed. In one arrangement, the second domains 720-x are structural domains; the polymer blocks 722 contain a polymer that has high mechanical strength. The third domains 730-x add other desirable properties; the polymer blocks 732-x contain a polymer that enhances or adds a desirable property to an electrolyte. The third domains 730-x can be chosen to increase the overall toughness of the nanostructured gel polymer electrolyte, making it easier to process. In another arrangement, the roles of the second domains 720-x and the third domains 730-x are reversed.

In another embodiment of the invention, the second domains 720-x are conductive domains; the polymer blocks 722 contain a polymer that is ionically conductive by itself and/or that provides a matrix into which an ionically-conductive liquid electrolyte can be absorbed. In one arrangement, the first domains 710-x are structural domains; the polymer blocks 712-x contain a polymer that has high mechanical strength. The third domains 730-x add other desirable properties; the polymer blocks 732-x contain a polymer that enhances or adds a desirable property to an electrolyte. The third domains 730-x can be chosen to increase the overall toughness of the nanostructured gel polymer electrolyte, making it easier to process. In another arrangement, the roles of the first domains 710-x and the third domains 730-x are reversed.

In yet another embodiment of the invention, the third domains 730-x are conductive domains; the polymer blocks 732-x contain a polymer that is ionically conductive by itself and/or that provides a matrix into which an ionically-conductive liquid electrolyte can be absorbed. In one arrangement, the first domains 710-x are structural domains; the polymer blocks 712 contain a polymer that has high mechanical strength. The second domains 720-x add other desirable properties; the polymer blocks 722 contain a polymer that enhances or adds a desirable property to an electrolyte. The third domains 730-x can be chosen to increase the overall toughness of the nanostructured gel polymer electrolyte, making it easier to process. In another arrangement, the roles of the first domains 710-x and the second domains 720-x are reversed.

Figure 8A:
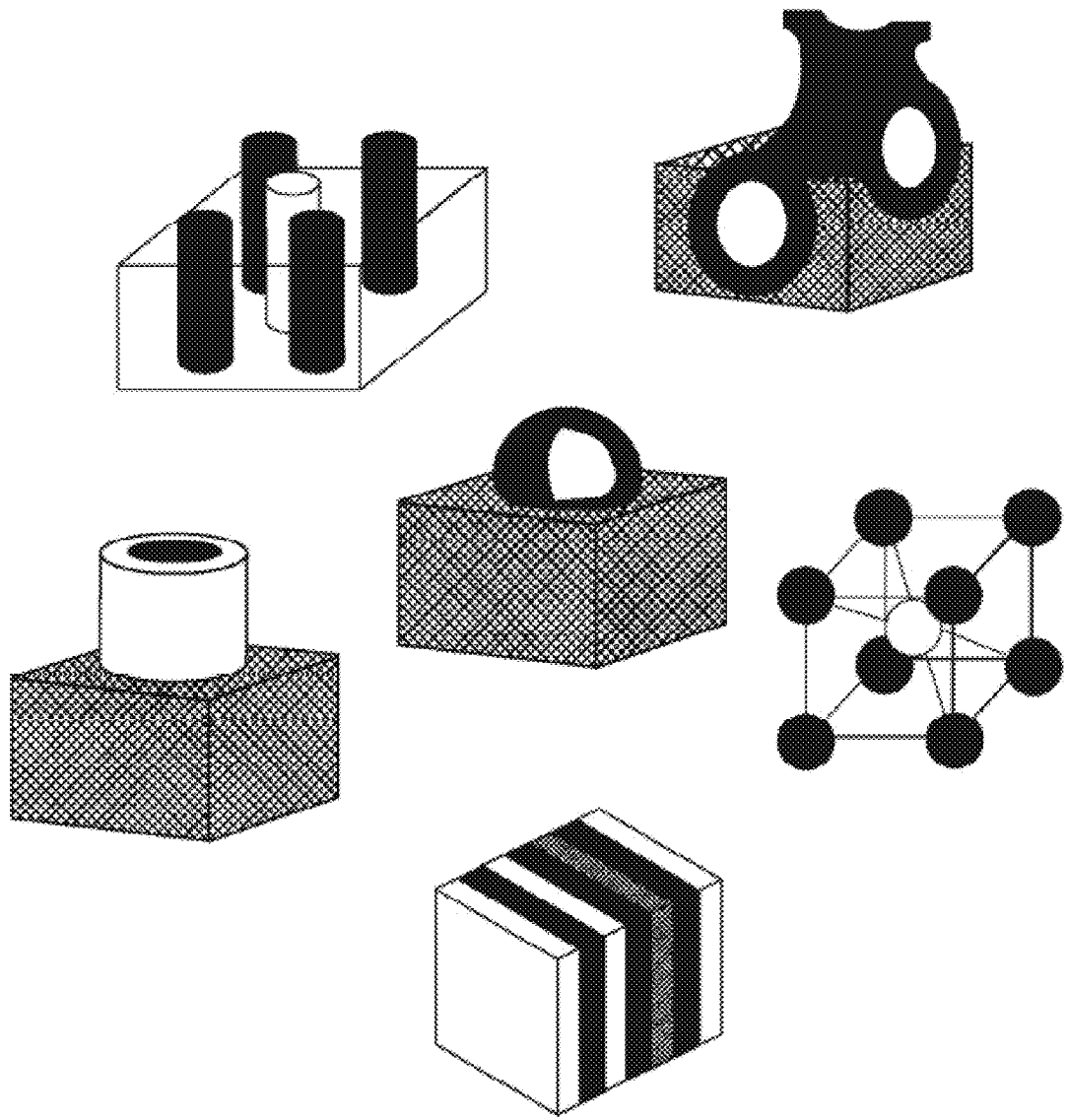
FIGS. 8A-8C are simplified illustrations of some of the morphologies that are possible for a solid electrolyte material formed from a three-domain, triblock electrolyte.
Figure 8B:
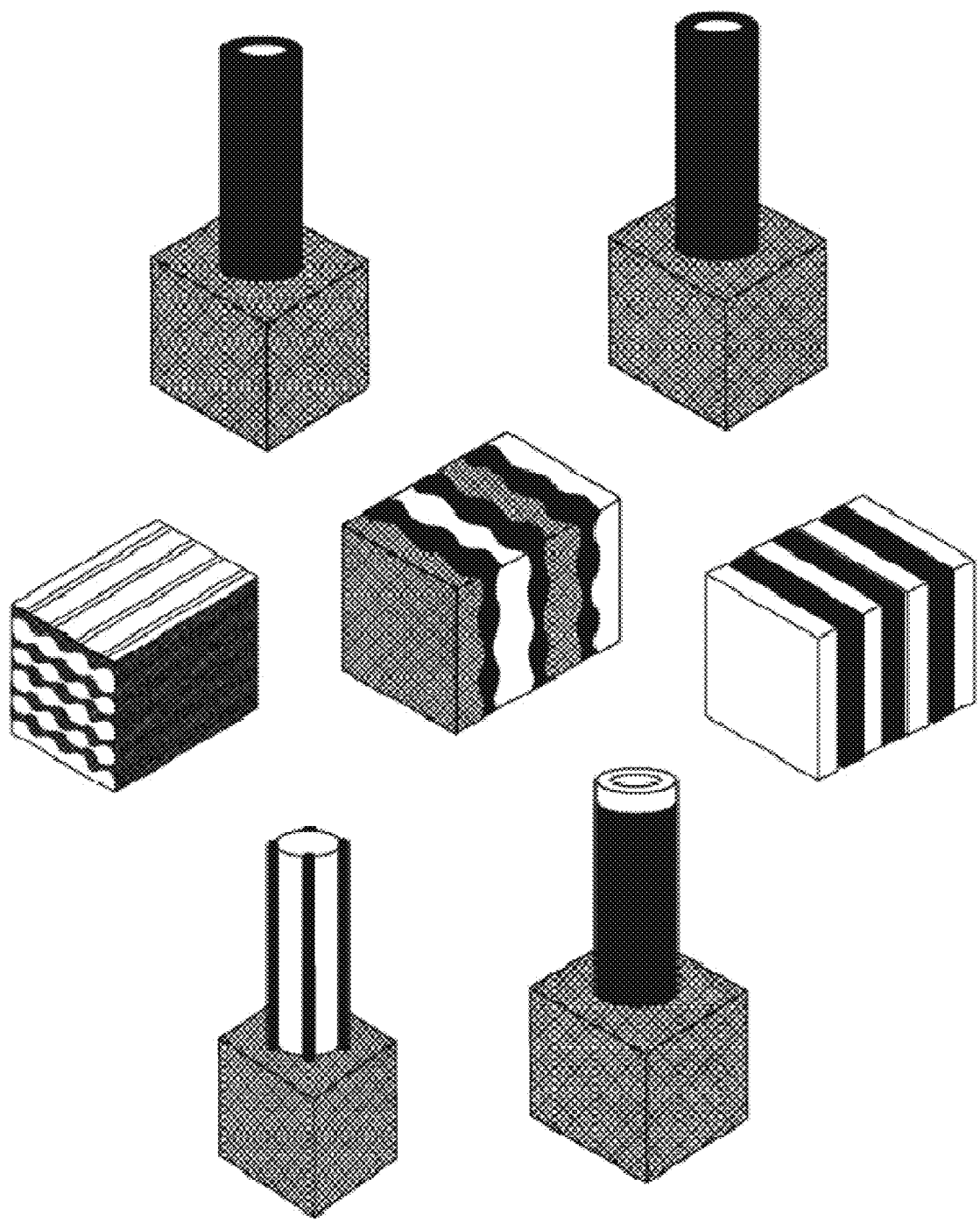
Figure 8C:
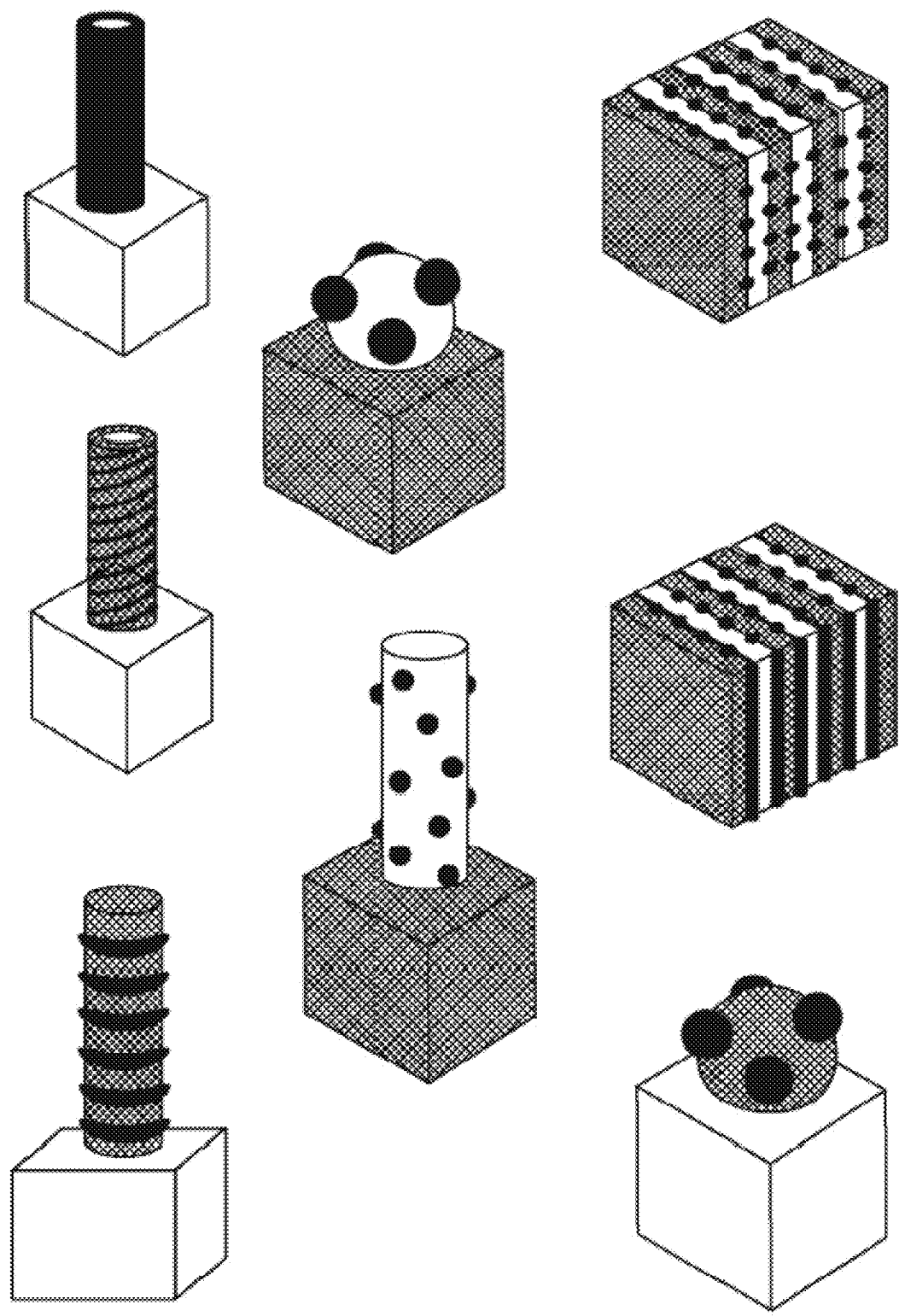

Triblocks can arrange themselves into a variety of morphologies, as is well known in the art. In the embodiments of the invention, as disclosed herein, the triblocks may arrange themselves into any geometrically possible morphology without limitation. Examples of possible morphologies for a three-phase triblock structure include, but are not limited to those shown in FIGS. 8A-8C. The morphologies include two primary domains as indicated by the patterned domains and the white domains in the figures. The morphology further includes a third domain as indicated by black domain in the figure.

In one embodiment, one of the primary domains (either the patterned domain or the white domain) is a structural domain and the other primary domain is a conductive domain. The third domain need not be conductive or structural but can add other desirable properties to the nanostructured gel polymer electrolyte, as has been discussed above.

In one arrangement, the block copolymers of the nanostructured gel polymer electrolyte are linear copolymers. In another arrangement, the block copolymers of the nanostructured gel polymer electrolyte are branched copolymers. In another arrangement, the block copolymers of the nanostructured gel polymer electrolyte are diblock copolymers. In another arrangement, the block copolymers of the nanostructured gel polymer electrolyte are triblock copolymers In some arrangements, the microstructure of the nanostructured gel polymer electrolyte includes aligned or otherwise anisotropic domains, as well as defects and locally non-continuous regions. In some arrangements, the macrostructure has isolated grains with unique compositions or orientations.

In one embodiment, polymers for use in nanostructured gel polymer electrolytes can be chosen using the following guidelines. It is useful if the conductive polymer has an ionic conductivity of at least $10^4$ Scm$^{-1}$ at 25° C. when combined with a liquid electrolyte, as described above, and is thermally stable at electrochemical cell operating temperatures of interest (e.g., between about 0 and 90° C.). It is useful if the conductive polymer is chemically stable against lithium salts. It is useful if the structural polymer has a modulus in excess of $1 \times 10^6$ Pa at electrochemical cell operating temperatures of interest. In other arrangements, it is useful if the structural polymer has a modulus in excess of $1 \times 10^7$ Pa at electrochemical cell operating temperatures of interest. It is especially useful if, in its homopolymer state, the structural polymer swells less than 5% in the presence of the liquid electrolyte that is used in the conductive polymer. The third phase polymer may be rubbery or have a glass transition temperature lower than the electrochemical cell operating and processing temperatures of interest. It is useful if all materials in the nanostructured gel polymer electrolyte are mutually immiscible.

Examples of polymers that can be used in the conductive phase of the nanostructured gel polymer electrolyte include, but are not limited to, polyethers, linear copolymers, and polyamines. In one arrangement, polyethylene oxide is used. In another arrangement, a linear copolymer containing an ether is used. In other arrangements, linear polyethers, linear polyacronitriles, linear polyvinylalcohols, and linear polyacrylates can be used. In yet other arrangements, polymers that have comb structures with a backbone that has a low glass-transition temperature, such as polysiloxane, polyphosphazene, polyether, polyethylene, polyacrylate, and pendants that are substituted polyethylene glycols, such as PEG-dimethyl ether, PEG-EC, and PEG-CN can be used. Further details on such polymers can be found in U.S. Provisional Patent Application No. 61/056,688, filed Apr. 8, 2008, which is included by reference herein.

In one embodiment, a liquid electrolyte that is added to the conductive phase contains a solvent and a salt. Some examples of appropriate solvents include, but are not limited to polar additives such as substituted ethers, substituted amines, substituted amides, substituted phosphazenes, substituted PEGs (see paragraph above), alkyl carbonates, nitriles, boranes, and lactones. In one arrangement, the solvent has a molecular weight of no more than 5,000 Daltons. In another arrangement, the solvent has a molecular weight of no more than 1000 Daltons. An exemplary liquid electrolyte may be characterized by an ionic conductivity of at least $1 \times 10^{-4}$ Scm$^{-1}$ at 25° C. According to another embodiment, an exemplary liquid electrolyte may be characterized by an ionic conductivity of at least $1 \times 10^{-3}$ Scm$^{-1}$ at 25° C. It is especially useful if, in its homopolymer state, the polymer used for the structural phase swells less than 5% in the presence of the solvent that is used in the liquid electrolyte.

In another embodiment of the invention, the solvent can be a room temperature ionic liquid, such as N-butyl-N31 methylpyrrolidinium bis(3 trifluoromethanesulfonyl)imide [PYR14+TFSI−] or 1-butyl-3-methylimidazolium bis(trifluoromethanesulfonyl)imide [BMITFSI]. In another embodiment of the invention, the solvent can be a Lewis acid, such as polyethylene glycol borate ester or polyethylene glycol aluminate ester. In yet another embodiment of the invention, the solvent can be a high dielectric organic plasticizer, such as ethylene carbonate or propylene carbonate.

In one embodiment of the invention, less than 20% of the solvent in the first domain vaporizes after the electrolyte material has been heated to temperatures as high as 100° C. for 60 minutes. In another embodiment of the invention, less than 10% of the solvent in the first domain vaporizes after the electrolyte material has been heated to temperatures as high as 100° C. for 60 minutes.

There are no particular restrictions on the electrolyte salt used in the embodiments of the present invention; any electrolyte salt that includes an ion identified as a desirable charge carrier can be used. It is especially useful to use electrolyte salts that have a large dissociation constant within the solvent. Suitable examples include alkali metal salts, quaternary ammonium salts such as $(CH_3)_4NBF_6$, quaternary phosphonium salts such as $(CH_3)_4PBF_6$, transition metal salts such as $AgClO_4$, or protonic acids such as hydrochloric acid, perchloric acid, and fluoroboric acid, and of these, alkali metal salts, quaternary ammonium salts, quaternary phosphonium salts, and transition metal salts are preferred.

Specific examples of suitable electrolyte salts include conventional alkali metal salts such as metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. The electrolyte salts may be used either singularly, or in mixtures of two or more different salts.

In some arrangements, lithium salts are used. Examples of specific lithium salts include $LiSCN$, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, $LiN(SO_2CF_3)_2$, $LiN(SO_2CF_2CF_3)_2$, lithium alkyl fluorophosphates, lithium oxalatoborate, as well as other lithium bis(chelato)borates having five to seven membered rings, lithium bis(trifluoromethane sulfone imide) (LiTFSI), $LiPF_3(C_2F_5)_3$, $LiPF_3(CF_3)_3$, $LiB(C_2O_4)_2$, and mixtures thereof. In other embodiments of the invention, for other electrochemistries, electrolytes are made by combining the polymers with various kinds of salts. Examples include, but are not limited to $AgSO_3CF_3$, $NaSCN$, $NaSO_3CF_3$, $KTFSI$, $NaTFSI$, $Ba(TFSI)_2$, $Pb(TFSI)_2$, and $Ca(TFSI)_2$.

In one embodiment of the invention the conductive phase also contains a plurality of ceramic particles, such as $Al_2O_3$ particles, $TiO_2$ particles, and/or $SiO_2$ particles. In one arrangement, the ceramic particles have a smallest dimension of no more than 5 nanometers.

Examples of polymers for use in the structural phase of the nanostructured gel polymer electrolyte include, but are not limited to, polystyrene, polymethacrylate, polyvinylpyridine, polyvinylcyclohexane, polyimide, polyamide, and polypropylene. Other materials that can be used for the structural phase include, but are not limited to copolymers that contain styrene, methacrylate, and vinylpyridine. In one arrangement, the structural phase is made of polymer blocks that have a bulk modulus greater than $10^6$ Pa at 90° C. It is especially useful if, in its homopolymer state, the polymer used for the structural phase swells less than 5% in the presence of the solvent that is used in the liquid electrolyte.

Examples of polymers for use in the third phase of the nanostructured gel polymer electrolyte include, but are not limited to rubbery polymers made of polysiloxanes, polyacrylates, or polydienes. An exemplary polysiloxane is polydimethylsiloxane. An exemplary polyacrylate is poly(2-ethylhexyl acrylate), polydecyl methacrylate or polylauryl methacrylate. An exemplary polydiene is polyisoprene or polybutadiene. In another arrangement, the third phase is made of one of several types of linear polymer blocks. The third phase may be a minor phase and may increase the overall toughness of the nanostructured gel polymer electrolyte.

The nanostructured gel diblock copolymer electrolyte, as disclosed herein, can be made of any of several materials. In one arrangement, the nanostructured gel polymer electrolyte is made of poly(styrene-block-ethylene oxide) (SEQ) diblock copolymers containing a first conductive phase of polyethylene oxide and a second structural phase of polystyrene. A SEQ diblock copolymer electrolyte can have a molecular weight between about 100,000 and 1,000,000 Daltons. In one arrangement, a SEQ diblock copolymer electrolyte has a molecular weight between about 100,000 and 500,000 Daltons. In another arrangement, a SEQ diblock copolymer electrolyte has molecular weight of about 400,000 Daltons. In some arrangements, the SEQ diblock copolymer electrolyte is brittle, and can break apart easily when attempts are made to form a free-standing thin film. In general, the toughness of the nanostructured gel polymer electrolyte increases with molecular weight.

The two-phase nanostructured gel triblock copolymer electrolyte, as disclosed herein, can be made of any of several materials. In one arrangement, the nanostructured gel polymer electrolyte is made of poly(styrene-block-ethylene oxide-block-styrene) (SEOS) triblock copolymers containing a first structural phase and a second conductive phase. A SEQ triblock copolymer electrolyte can have a molecular weight between about 100,000 and 1,000,000 Daltons. In one arrangement, a SEQ triblock copolymer electrolyte has a molecular weight between about 100,000 and 500,000 Daltons. In another arrangement, a SEQ triblock copolymer electrolyte has molecular weight of about 400,000 Daltons. In some arrangements, the SEOS triblock copolymer electrolyte is not brittle, and does not break apart easily when attempts are made to form a free-standing thin film.

In another arrangement, the nanostructured gel polymer electrolyte is made of poly(ethylene oxide-block-styrene-block-ethylene oxide) (EOSEO) triblock copolymers. An EOSEO triblock copolymer electrolyte can have a molecular weight between about 100,000 and 1,000,000 Daltons. In one arrangement, an EOSEO triblock copolymer electrolyte has a molecular weight between about 100,000 and 500,000 Daltons. In another arrangement, an EOSEO triblock copolymer electrolyte has molecular weight of about 400,000 Daltons.

The three-phase nanostructured gel triblock copolymer electrolyte, as disclosed herein, can be made of any of several materials. In one arrangement, the nanostructured gel polymer electrolyte is made of poly(isoprene-block-styrene-block-ethylene oxide) (ISEO) triblock copolymers. An ISEO triblock copolymer electrolyte can have a molecular weight between about 100,000 and 1,000,000 Daltons. In one arrangement, an ISEO triblock copolymer electrolyte has a molecular weight between about 100,000 and 500,000 Daltons. In another arrangement, an ISEO triblock copolymer electrolyte has molecular weight of about 400,000 Daltons.

Figure 9:
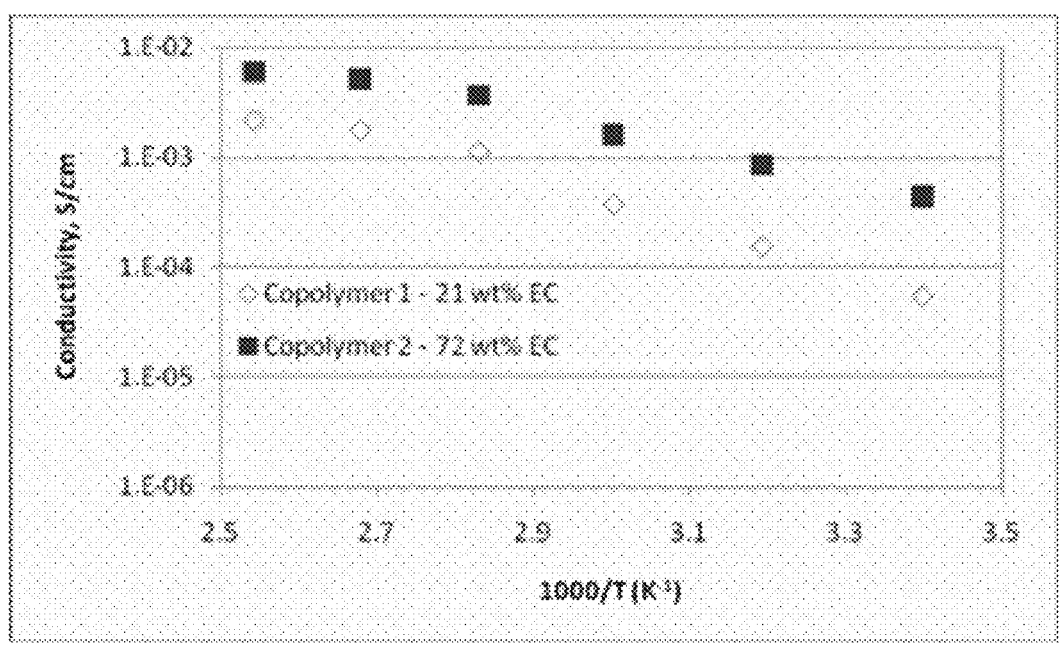
FIG. 9 is a simplified illustration showing the conductivity of two poly(styrene-block-ethyleneoxide) copolymer gels swollen with ethylene carbonate (EC) as a function of temperature.

FIG. 9 is a plot of ionic conductivity as a function of inverse temperature for two nanostructured gel polymer electrolytes, according to embodiments of the invention. Both Copolymer 1 and Copolymer 2 are two-phase nanostructured gel polymer electrolytes with 60 weight % conductive domain and 40 wt % structural domain. Within the conductive gel domain, Copolymer 1 contains 79 wt % polyethylene oxide (PEO) and 21 wt % ethylene carbonate (EC), a liquid electrolyte. Within the conductive gel domain, Copolymer 2 contains 28 wt % PEO and 72 wt % EC. The graph shows a higher ionic conductivity for Copolymer 2, which has more ethylene carbide than Copolymer 1, indicating that the highly-gelled conductive phase has increased conductivity as compared to the "drier" conductive phase.

The following are descriptions of various embodiments of processing techniques that can be employed to manufacture a gel electrolyte system as contemplated under the invention. According to an embodiment, the domain structure of the separator is formed and maintained through kinetic control of the various phases, and in particular kinetic restriction of an otherwise thermodynamically favored phase separation. Disparate homopolymers blended in solution may form the desired domain structures through fast removal of solvent, and in some cases slight activation by then heating the dry polymer. To maintain the morphology, the material may then either be kept at low temperatures to prevent phase separation, or with variations of these homopolymers, covalent cross linking may be used to effectively freeze the morphological state.

According to another embodiment employing block-copolymer based electrolytes as described above, the morphology is maintained through covalent bonding between phases, and the specific morphology obtained is dependent on the composition, volume fraction, and molecular architecture of polymer. An exemplary method for synthesizing poly(styreneblock-ethylene oxide) (SEQ) diblock copolymer includes synthesizing polystyrene (PS) as a first block and synthesizing ethylene oxide (EO) as a second block. The method includes distilling purified benzene into a reactor on a vacuum line and taking the reactor from the vacuum line into a glove box where an initiator such as s-butyllithium may be added. The method includes returning the reactor to the vacuum line to be degassed and distilling styrene monomers into the reactor.

The method includes heating the reactor to room temperature, stirring for at least six hours, and isolating an aliquot of living polystyrene precursors in the glove box for molecular weight determination. The method includes returning the reactor to the vacuum line to be thoroughly degassed and distilling a few milliliters of ethylene oxide into the degassed reactor. The method includes heating the reactor to a room temperature, stirring for two hours, taking the reactor back to the glove box, and adding a strong base in 1:1 molar ratio to an initiator. The method includes adding t-butyl phosphazene base (t-BuP4) as the strong base.

The method includes returning the reactor to the vacuum line to be thoroughly degassed, stirring at room temperature for 12 hours to allow the t-BuP4 to react with the ethylene oxide-terminated PS chains, and distilling a desired amount of ethylene oxide into the reactor using dry ice/isopropanol. The method includes heating the reactor to 50° C. and stirring for five days in a hot water bath. The method includes returning the reactor to the glove box, terminating the living SEQ diblock copolymer using methanol, and isolating the SEQ diblock copolymer by precipitation in hexane and vacuum freeze drying from benzene.

An exemplary method for making a poly(styrene-block-ethylene oxide-blockstyrene) (SEOS) triblock copolymers is similar to the method of making SEQ as described above. However, instead of terminating the final polymer with methanol, dichlorodimethylsilane is preferably used as a bifunctional terminator. According to the embodiment, the bifunctional terminator couples two SEQ chains together to form SEOS chains.

The method includes, after the addition of the bifunctional terminator, allowing the reaction mixture to stir for 5 days to enable the slow reaction to proceed to completion. The method includes adding methanol to terminate any remaining living chains and isolating SEOS triblock copolymers by precipitation in hexane and vacuum freeze drying from benzene.

An exemplary method for synthesizing poly(ethylene oxide-block-styrene-blockethylene oxide) (EOSEO) triblock copolymers is similar to the method for making SEQ as described above. However, instead of initiating the styrene with s-butyllithium, a bifunctional initiator is preferably used. According to the embodiment, the initiator allows the PS chain to grow from both chain ends. In a specific embodiment, potassium naphthalene in THF can be used as the bifunctional initiator.

According to an embodiment, an exemplary method further includes isolating an aliquot of the living polystyrene precursor in the glove box for molecular weight determination and returning the reactor to the vacuum line to be thoroughly degassed. The method includes distilling a few milliliters of ethylene oxide into the degassed reactor. The method includes heating the reactor to a room temperature, stirring for two hours, taking the reactor back to the glove box, and adding a strong base in 1:1 molar ratio to an initiator. The method includes adding t-butyl phosphazene base (t-BuP4) as the strong base. The method includes returning the reactor to the vacuum line to be thoroughly degassed, stirring at room temperature for 12 hours to allow the t-BuP4 to react with the ethylene oxide-terminated PS chains, and distilling a desired amount of ethylene oxide into the reactor using dry ice/isopropanol. The method includes heating the reactor to 50° C., stirring for five days in a hot water bath, and returning the reactor to the glove box. The method includes terminating the living EOSEO triblock copolymer using methanol and isolating the EOSEO triblock copolymer by precipitation in hexane and by vacuum freeze drying from benzene.

An exemplary method for synthesizing poly(isoprene-block-styrene-block-ethylene oxide) (ISEO) triblock copolymers includes synthesizing a polyisoprene block in benzene. The method includes distilling purified benzene into a reactor on a vacuum line, taking the reactor from the vacuum line into the glove box where an initiator such as s-butyllithium is added. The method includes returning the reactor to the vacuum line to be degassed, distilling the isoprene monomer into the reactor, stirring the mixture for at least six hours, and isolating an aliquot of the living polyisoprene precursor in the glove box for molecular weight determination.

The method includes returning the reactor to the vacuum line to be thoroughly degassed, distilling the styrene into the living polyisoprene solution and allowing the reaction to proceed for at least six hours to form polyisoprene-block-polystyrene living polymers. The method includes cooling the reactor with dry ice/isopropanol, distilling a few milliliters of ethylene oxide into the reactor, heating the reactor to room temperature, and stirring for two hours. The method includes taking the reactor to the glove box and adding a strong base in a 1:1 molar ratio to the initiator. The method includes adding t-butyl phosphazene base (t-BuP4) as the strong base.

The method includes returning the reactor to the vacuum line to be thoroughly degassed, stirring at room temperature for 12 hours to allow the t-BuP4 to react with the ethylene oxide-terminated PI-PS chains, and distilling a desired amount of ethylene oxide into the reactor using dry ice/isopropanol. The method includes heating the reactor to 50° C. and stirring for five days in a hot water bath. The method includes returning the reactor to the glove box, terminating the living ISEO triblock copolymers using methanol, and isolating the ISEO diblock copolymer by precipitation in hexane and vacuum freeze drying from benzene.

According to an embodiment for purifying benzene to make a gel electrolyte material, starting material benzene may be purchased from Aldrich. An exemplary method for purifying benzene includes stirring on freshly ground calcium hydride for at least eight hours in a long neck flask attached to a vacuum line. The method includes freezing the mixture of calcium hydride using liquid nitrogen and degassing the mixture under vacuum. The method includes distilling benzene out of the calcium hydride mixture onto a sbutyllithium purification stage, stirring the benzene on the s-butyllithium for at least eight hours, and degassing.

According to an embodiment for purifying styrene to make a gel electrolyte material, starting material styrene may be purchased from Aldrich. An exemplary purified styrene may be stored in a freezer prior to use. According to the embodiment, the method includes pouring styrene into a flask attached to the vacuum line, freezing and degassing. The method includes pipetting dibutylmagnesium (1.0 M in heptane) into a second flask in a glove box, adding ten mL of dibutylmagnesium for every 100 mL of styrene to purify. The method includes attaching the flask to the vacuum line, distilling the heptane out of the dibutylmagnesium flask, distilling the styrene onto the dibutylmagnesium, stirring the styrene on the dibutylmagnesium for at least eight hours, and thoroughly degassing.

According to an embodiment for purifying isoprene to make a gel electrolyte material, starting material isoprene may be purchased from Aldrich. An exemplary purified isoprene may be stored in a freezer prior to use. According to the embodiment, the method includes pouring isoprene into a long neck flask containing freshly ground calcium hydride, attaching the flaks to a vacuum line, and freezing and degassing. The method includes pipetting s-butyllithium (1.4 M in cyclohexane) into a second long neck flask, adding ten mL of s-butyllithium for every 100 mL of isoprene to purify, distilling the cyclohexane of the sbutyllithium flask, and distilling the isoprene into the dried s-butyllithium using dry ice/isopropanol as the coolant. The method includes removing the mixture from the dry ice and stirring without coolant for three minutes, ensuring that the flask is not left out of the cooling bath for longer than three minutes. The method includes freezing the mixture in liquid nitrogen, degassing, repeating the stirring/degassing procedure twice more to enhance purity, and distilling isoprene into a measuring ampoule to get the isoprene to be ready to use.

According to an embodiment for purifying ethylene oxide to make a gel electrolyte material, starting material ethylene oxide may be purchased from Aldrich. An exemplary method includes condensing ethylene oxide into a long neck flask containing freshly ground calcium hydride using dry ice/isopropanol as the coolant and freezing and degassing ethylene oxide, which may be stored in a gas cylinder in a refrigerator prior to use. The method includes stirring ethylene oxide for a minimum of eight hours on the calcium hydride while packed in dry ice/isopropanol, pipetting n-butyllithium into a second long neck flask, attaching the flask to the vacuum line and degassing.

The method includes adding ten mL of n-butyllithium in hexane for every 100 mL of ethylene oxide to purify, distilling hexane out of the n-butyllithium flask, and distilling ethylene oxide into the dried n-butyllithium using dry ice/isopropanol as coolant. The method includes removing and replacing a dry ice/isopropanol bath, stirring the mixture for 30 minutes at 0° C., and ensuring the mixture does not warm above 0° C. in order to prevent unsafe runaway reactions. The method includes distilling ethylene oxide out of the nbutyllithium into a measuring ampoule using dry ice/isopropanol as the coolant and keeping the ampoule at 0° C. to get the ethylene oxide to be ready to use.

According to an embodiment for purifying dichlorodimethylsilane to make a gel electrolyte material, starting material dichlorodimethylsilane may be purchased from Aldrich. According to the embodiment, the method includes stirring on freshly ground calcium hydride for at least eight hours in a long neck flask attached to a vacuum line. The method includes freezing the dichlorodimethylsilane and degassing thoroughly prior to use.

Besides the above, according to another embodiment, additional steps must be taken in preparing the starting materials and purifying the materials. According to an embodiment, the specific steps include drying a polymer separator. The method for drying a polymer separator includes synthesizing the diblock and triblock copolymers as described previously. To ensure that the blends were free of water, the method includes drying each component prior to mixing. The method includes heating the polymers to 150° C. under vacuum in the glovebox antechamber and keeping in the chamber for 12 hours to remove any moisture. The method includes keeping the polymers in the argon filled glovebox until the gels were prepared.

According to another embodiment, the specific steps include preparing salt components of an exemplary electrolyte. The method for preparing salt components includes drying Lithium bis(trifluoromethane)sulfonimide (Li TFSI) purchased from Aldrich prior to use. The method includes, due to the high hygroscopic nature of Li TFSI, handling the Li TFSI only in the argon glovebox. To ensure that the Li TFSI is dry, the method includes heating Li TFSI in the glovebox antechamber at 150° C. under vacuum for 12 hours. The method includes keeping Li TFSI in the argon filled glovebox until the gels were prepared.

According to another embodiment, the specific steps includes purifying ethylene carbonate. The method for purifying EC includes a two step procedure involving ethylene carbonate (EC) purchased from Aldrich. EC is used as the solvent in the gel electrolyte contemplated under the current invention. Because EC is a solid at room temperature, the method includes first heating to 60° C. and stirring over molecular sieves (4 A) to remove water contamination. The method includes distilling EC to remove heavy impurities. The method includes after purification storing the EC in the glovebox until the gels are prepared.

According to another embodiment, the specific steps includes preparing polymer gels. The method for preparing polymer gels includes filling argon in the glovebox and keeping the material air-free throughout the processing steps. The method includes preparing a compatiblizing solvent mixture of benzene and acetonitrile in the ratio of 20 to 1 by volume. The method includes weighting the polymer, Li TFSI, and EC is into jars in the desired quantities. The method includes adding the compatiblizing solvent mixture to the jars to prepare approximate 2 wt % polymer/Li TFSI/EC solutions. The method includes stirring solutions for at least 12 hours to ensure complete dissolution and mixing of the polymer.

According to the embodiment, the method includes freezing the TFSI/EC solutions using dry ice and freeze drying the frozen solutions under vacuum. The method includes applying vacuum for 2 days to ensure removal of the benzene and acetonitrile from the mixture. The method includes returning the dried samples to the glovebox making sure not to expose them to air. The method includes compression molding the samples and using the sample to make battery electrolytes.

According to an embodiment, the specific steps include selecting certain polymers as additives. According to the embodiment, addition of the EC as a solvent to the polymer-salt electrolytes resulted in increased conductivity as compared to the "neat" polymer-salt electrolyte. However, if too much EC is added to the copolymers, the polymers swell too much in the EC solvent. This results in a loss of mechanical properties of the electrolyte. Because EC swells the conductive phase of the copolymers and does not swell the mechanically rigid phase, it is possible to add a small enough amount of EC to the copolymers to increase conductivity while maintaining mechanical integrity. The method includes adding a small amount of EC as additives to the gel electrolyte system such that the mechanically rigid phase occupies a sufficient volume fraction of the gel to maintain and further promote structural integrity.

The method includes balancing the increasing amount of EC in the conductive phase with the need to keep the swollen conductive phase below a sufficient volume fraction to maintain mechanical integrity. According to an embodiment, this tradeoff can be maximized if the original copolymer contains the conductive phase as a minor component, specifically in the range of 10 to 30%. The method includes providing a minor component in the range of 10 to 30% volume fraction to create an architecture allowing the conductive phase to be highly swollen with EC while maintaining the total conductive phase volume below the sufficient fraction to maintain mechanical integrity.

In another embodiment of the invention, a battery cell is provided. The battery cell has a positive electrode, a negative electrode, and a nanostructured gel a nanostructured gel polymer electrolyte positioned to provide ionic communication between the positive electrode and the negative electrode. The nanostructured gel polymer electrolyte has a first domain comprising an ionically-conductive polymer gel phase, a second domain (adjacent the first domain) comprising a structural polymer phase, and an electrolyte salt. The first domain forms a conductive portion of the electrolyte material and the second phase forms a structural portion of the electrolyte material. The structural polymer phase has a bulk modulus greater than $10^6$ Pa at 25° C. The nanostructured gel polymer electrolyte material has an ionic conductivity of at least $1\times10^{-4}$ Scm$^{-1}$ at 25° C. In one arrangement, the first domain comprises polyethylene oxide. In another arrangement, the second domain comprises polystyrene.

The above disclosure provides for an electrolyte material exhibiting both high mechanical stability and high conductivity, that provide controlled nanostructured pathways for ionic flow and that is adaptable to be manufactured using conventional polymer processing methods. While the current inventions have been described in the context of the above specific embodiments, modifications and variations are possible. For example, the concept of using a multi-phase polymer system can be extended to other gel electrolyte systems, both aqueous and non-aqueous, to improve the mechanical strength and conductivity of battery electrolytes. Accordingly, the scope and breadth of the present invention should not be limited by the specific embodiments described above and should instead be determined by the following claims and their full extend of equivalents.

We Claim:

1. A nanostructured electrolyte material comprising:
a lamellar structure comprising:
a first domain comprising an ionically-conductive polymer gel phase, the first domain forming a conductive portion of the electrolyte material; and
a second domain adjacent the first domain, the second domain comprising a structural polymer phase, the structural polymer phase having a bulk modulus greater than $10^6$ Pa at 25° C., the second domain forming a structural portion of the electrolyte material;
wherein the ionically-conductive polymer gel phase comprises a polymer matrix and a liquid electrolyte that contains one or more solvents and a salt;
wherein the electrolyte material has an ionic conductivity of at least $1\times10^{-4}$ Scm$^{-1}$ at 25° C.

2. The electrolyte material of claim 1 wherein the polymer gel phase comprises a liquid electrolyte that comprises one or more solvents.

3. The electrolyte material of claim 2 wherein the solvent comprises one or more polar additives selected from the group consisting of substituted ethers, substituted amines, substituted amides, substituted phosphazenes, substituted PEGs, alkyl carbonates, nitriles, boranes, and lactones.

4. The electrolyte material of claim 3 wherein the solvent comprises one or more room-temperature ionic liquids.

5. The electrolyte material of claim 3 wherein the solvent comprises one or more Lewis acids.

6. The electrolyte material of claim 3 wherein the solvent comprises one or more high dielectric organic plasticizers.

7. The electrolyte material of claim 3 wherein the structural polymer phase swells less than 5% in the presence of the liquid electrolyte.

8. The electrolyte material of claim 1 wherein the structural polymer phase has a bulk modulus greater than $1\times10^6$ Pa at 90° C.

9. The electrolyte material of claim 1 wherein the electrolyte material is non-fluorinated.

10. The electrolyte material of claim 1, wherein the electrolyte material has no cross-linking.

11. The electrolyte material of claim 1 wherein the electrolyte material has an ionic conductivity of at least $1\times10^{-3}$ S cm$^{-1}$ at 25 ° C.

12. The electrolyte material of claim 1 wherein the electrolyte material comprises a plurality of block copolymers, the first domain comprises a plurality of first ionically-conductive polymer blocks, and the second domain comprises a plurality of second structural polymer blocks.

13. The electrolyte material of claim 12 wherein the first polymer blocks comprise one or more polymers selected from the group consisting of polyethers, linear copolymers, polyamines polyethylene oxide, linear polyethers, linear polyacronitriles, linear polyvinylalcohols, and linear polyacrylates.

14. The electrolyte material of claim 12 wherein the first polymer blocks comprise one or more comb polymers that have low glass-transition temperature backbones selected from the group consisting polysiloxane, polyphosphazene, polyether, polyethylene, and polyacrylate.

15. The electrolyte material of claim 12 wherein the first polymer blocks comprise one or more comb polymers that have pendants selected from the group consisting of substituted polyethylene glycols, such as PEG-dimethyl ether, PEG-EC, and PEG-CN.

16. The electrolyte material of claim 12 wherein the second polymer blocks comprise one or more components selected from the group consisting of polystyrene, polymethacrylate, polyvinylpyridine, polyvinylcyclohexane, polyimide, polyamide, polypropylene, and copolymers thereof.

17. A battery cell, comprising:
a positive electrode;
a negative electrode; and a nanostructured gel polymer electrolyte positioned to provide ionic communication between the positive electrode and the negative electrode;

wherein the nanostructured gel polymer electrolyte comprises:

a lamellar structure comprising:

a first domain comprising an ionically-conductive polymer gel phase, the first domain forming a conductive portion of the electrolyte material; and a second domain adjacent the first domain, the second domain comprising a structural polymer phase, the structural polymer phase having a bulk modulus greater than $10^6$ Pa at 25° C., the second domain forming a structural portion of the electrolyte material;

wherein the ionically-conductive polymer gel phase comprises a polymer matrix and a liquid electrolyte that contains one or more solvents and a salt;

wherein the electrolyte material has an ionic conductivity of at least $1 \times 10^{-4}$ Scm$^{-1}$ at 25° C.

18. The battery cell of claim 17 wherein the first domain comprises polyethylene oxide.

19. The battery cell of claim 17 wherein the second domain comprises polystyrene.

20. The battery cell of claim 17, further comprising a third domain comprising a third phase.

21. The battery cell of claim 17 wherein the negative electrode comprises lithium metal.

* * * * *